United States Patent Office 2,916,353
Patented Dec. 8, 1959

2,916,353

PRODUCTION OF ALKALI METAL NITRATES FROM ALKALI METAL CHLORIDES

Clarence E. Lovell, Lakeland, Fla., and Clifford Jackson Lewis, Lakewood, Colo., assignors to Americal Metal Climax, Inc., a corporation of New York No Drawing. Application August 30, 1956
Serial No. 606,997

8 Claims. (Cl. 23—102)

This invention is concerned with an improved process for the production of alkali metal nitrates from nitrogen peroxide and the corresponding chlorides.

It is well known that an alkali metal chloride may be reacted with nitrogen oxides, especially nitrogen peroxide, or with nitric acid to form the corresponding nitrate. Under suitable conditions nitrosyl chloride and more or less chlorine are formed in addition to the nitrate.

Various processes have been proposed for bringing about the basic reactions of the nitrogen oxides with the chlorides to produce the corresponding nitrates and for producing chlorine as a valuable by-product, but for the most part the processes proposed up to the present time have presented serious practical operating difficulties.

For example, those processes wherein the reaction is carried out with the use of nitric acid or in aqueous solutions give rise to serious corrosion problems, and in addition involve the use of complex separation procedures to recover the chlorine value. It has also been proposed to minimize the corrosion difficulties by carrying on the reaction under anhydrous or substantially anhydrous conditions. However, here again certain practical difficulties are presented. If it be attempted to carry on the reaction by mixing the alkali metal chloride in solid particulate form with liquid nitrogen peroxide, it is necessary to use a very considerable excess of the relatively expensive peroxide in order to produce a handleable slurry that may be pumped or otherwise conveyed to or from the reaction zone and at the same time one that may be more or less freely mixed or stirred during the reaction stage. If it be attempted to use nitrogen peroxide vapors and pass them over or through a solid particulate mass of the alkali metal chloride the reaction proceeds very slowly unless enough moisture is present to give rise to corrosion problems. Furthermore, whether the alkali metal nitrate be disposed in a stationary granular bed with the peroxide passed therethrough in gaseous form or the contact between the solid chloride and the peroxide vapors is brought about by a fluidized solids technique, there is strong tendency for the solid particles to coalesce or stick together and form a solid mass long before the reaction is completed.

It is an object of the present invention to overcome or minimize the above mentioned difficulties in carrying on the reaction of alkali metal chlorides with nitrogen peroxide, and in particular to make it possible to carry on the reaction under conditions as respects the presence of a controlled small proportion of moisture that will tend to promote an efficient and rapid reaction between the chloride and nitrogen peroxide reactants without giving rise to objectionable corrosion conditions.

It is a further object and advantage of the invention to bring about the desired conversion of the alkali metal chloride to the corresponding nitrate with the use of liquid nitrogen peroxide and without having to resort to the use of a considerable excess of the peroxide.

It is a still further object of the invention to conduct the reaction under conditions which insure decreased volatility of the nitrogen peroxide with consequent lessened toxicity hazards to workmen and others who might be in and about the plant where the operation is being conducted.

It is a further object and advantage of the invention that a solid nitrate product is formed by reacting the chloride salt with nitrogen peroxide in the presence of a liquid suspension medium and thereafter may be separated from the suspension medium and recovered by conventional filtration procedures without recourse to solution and recrystallizing operations.

It is still another object and advantage of the invention that the use of higher reaction temperatures is made possible, and in fact, the nitrogen peroxide may be introduced in gaseous form and repeatedly brought into contact with the solid chloride particles that are to be converted to the nitrate while maintaining the reaction mixture in a permeable state free from tendency to caking of the resulting nitrate into impermeable masses.

Other objects and advantages will become apparent from the hereinafter more detailed description.

The invention in its broader aspects is based on our discovery that nitrogen peroxide readily dissolves in liquid halogenated hydrocarbons and in such a solution will react with an alkali metal chloride salt suspended therein to form the corresponding nitrate and a gaseous or liquid product containing chlorine.

Any of the halogenated hydrocarbons that are liquid at and around room temperature and at the temperatures below the highest set forth in Table I may be used in practising the invention. By way of example, the invention will be more specifically described by reference to the use of potassium chloride as the chloride reactant and carbon tetrachloride as the halogenated hydrocarbon.

There are set forth in the following table the results of a series of laboratory tests which were conducted for varying intervals of time, using varying proportions of nitrogen peroxide relative to the potassium chloride starting material and with varying proportions of water present. Sufficient carbon tetrachloride was provided to form a slurry containing 30% solids:

*Table 1*

| Run No. | $N_2O_4/KCl$ molar ratio | Percent $H_2O$ (by wt. of salt) | Reaction Time, hours | Maximum Temp., °C | Percent KCl Converted to $KNO_3$ | Percent $KNO_3$ in Product |
|---|---|---|---|---|---|---|
| 1 | 3 | 0 | 1½ | 25 | 19.6 | 22.9 |
| 2 | 3 | 0 | 4 | 22 | 17.8 | 21.1 |
| 3 | 3 | 0 | 3¾ | 45 | 22.9 | 27.8 |
| 4 | 3 | 3 | 4 | 45 | 89.4 | 90.2 |
| 5 | 3 | 3 | 3 | 45 | 72.1 | 76.1 |
| 6 | 3 | 3 | 3 | 45 | 69.5 | 75.0 |
| 7 | 3 | 0 | 3 | 45 | 18.5 | 22.4 |
| 8 | 3 | 1 | 3 | 45 | 36.1 | 41.1 |
| 9 | 3 | 3 | 3 | 45 | 68.7 | 73.8 |
| 10 | 3 | 2 | 3 | 45 | 63.5 | 69.0 |
| 11 | 3 | 5 | 3 | 45 | 79.5 | 82.6 |
| 12 | 1.1 | 3 | 1½ | 20 to 28 | 64.5 | 69.8 |
| 13 | 1.1 | 1 | 3 | 20 to 28 | 69.8 | 74.9 |
| 14 | 1.1 | 3 | 3 | 20 to 28 | 75.1 | 79.9 |
| 16 | 1 | 3 | 3 | 20 to 28 | 55.6 | 62.2 |
| 17 | 1 | 3 | 3 | 20 to 28 | 53.1 | 60.0 |
| 18 | 1 | 3 | 3 | 20 to 28 | 75.5 | 79.8 |
| 19 | 1 | 3 | 3 | 20 to 28 | 81.4 | 83.6 |
| 20 | 1 | 3 | 4 | 20 to 28 | 88.5 | 91.0 |

NOTES:
The percentages of water indicated are based on the weight of the KCl used in the respective experiments.

A commercial grade of KCl as supplied to the fertilizer trade and containing approximately 94.6% KCl with the remainder principally NaCl was used for runs Nos. 16 and 17.

In all of the other runs technical grade KCl −200 +270 mesh size was used.

For runs Nos. 1–6, 18–20 KCl was oven dried at 110° C. The KCl used for runs Nos. 16 and 17 contained 0.72% moisture which amount was taken into consideration when water was added to the system. The KCl salt used in runs Nos. 7 to 14 was previously dried at 250° C.

It will be understood that the results obtained in each of the test runs mentioned in the above table do not represent the ultimate as respects degree of conversion that may be obtained in practising the invention. The tests were intentionally run under varying conditions to evaluate the influence of various factors such as the use of an excess of nitrogen peroxide, the influence of moisture, operating temperature and time. The process may be operated to take advantage of particular desirable factors at a given time such as cost, availability, etc.

The results given show that a relatively high conversion may be obtained in a few hours by operating at a temperature selected within the range from room temperature up to 45° C. provided a small percentage of moisture is present. Our studies indicate that best results may be expected when the proportion of water present is about 3% by weight based on the weight of the chloride undergoing conversion. The percentage of moisture may be somewhat further increased without giving rise to corrosion since the liquid halogenated hydrocarbon appears to afford protection against corrosion by greatly diluting or dispersing the small amount of nitric acid that may be expected to be formed through reaction of nitrogen peroxide and the small amount of water provided. Since the nitric acid which may exist momentarily is in anhydrous form it is probably not appreciably ionized in the halogenated hydrocarbon medium and thus has little tendency to attack metal surfaces of the apparatus.

It will be observed that under similar conditions as to the amount of moisture present and the length of the test run practically the same extent of conversion was brought about when only equal molecular portions of nitrogen peroxide and potassium chloride were present as when the peroxide was provided in considerable excess. It is, of course, an important advantage to be able to keep the amount of peroxide being handled down to the minimum required. Furthermore, the solution in the halogenated hydrocarbon of the toxic nitrogen peroxide, which would otherwise be in a gaseous state at the temperatures employed, minimizes the toxicity hazards in handling the peroxide.

The process is advantageously conducted under conditions whereby the gaseous products formed in the reaction zone, together with any nitrogen peroxide vapors that may be evolved to a greater or lesser degree depending on the temperature maintained, are passed to a reflux condenser or fractionating tower wherein the nitrogen peroxide vapors are condensed and returned to the reaction zone while the nitrosyl chloride and any other uncondensed reaction products, such as chlorine, are carried off to a suitable point for their recovery and the treatment of the nitrosyl chloride to form chlorine and nitrogen peroxide which latter may be returned to the process. Various procedures are known for effecting this conversion, as, for example, the process disclosed in the copending application of W. A. Smith and J. J. Jacobs, Serial No. 597,263, filed July 11, 1956.

Suspension of the nitrate product in the halogenated hydrocarbon enables easy recovery of the solid alkali metal chloride product from the system by filtration procedures. The normally liquid halogenated hydrocarbons, and especially carbon tetrachloride, are characterized by relatively low viscosities so that the separation therefrom of the solid nitrate product by filtration is relatively complete and the loss of carbon tetrachloride or other halogenated hydrocarbon used can be kept low.

Although in the experiments the results of which are set forth in Table I, none of the products represents a complete conversion to $KNO_3$, it will be understood that the reaction can be carried further by prolonging the treatment time. The reaction will also be furthered by subjecting the solids to grinding to remove $KNO_3$ formed on the surfaces of the KCl particles, thereby exposing fresh surfaces to the action of the nitrogen peroxide. This may be done by conducting the reaction in a ball mill with the grinding taking place during the course of the reaction.

In order to increase its flowability in the dry state and meet the requirements as to purity and particle size for particular commercial uses, the finely divided product, after separation from the carbon tetrachloride suspension medium, may be subjected to appropriate further treatment. For example, if a high purity is needed, the product may be brought into aqueous solution and recrystallized in known manner. When granular products having enhanced properties as regards flowability are desired these may be produced through a recrystallization procedure as above or by a prelling treatment or other known procedures. The requirements as to the end use and state of purity demanded will usually dictate which of these procedures may be most economically used.

Throughout the specification and the appended claims the expression "nitrogen peroxide" is intended to refer to $NO_2$, $N_2O_4$ or mixtures of $NO_2$ and $N_2O_4$.

It will be understood that the temperature and other operating conditions employed in the above mentioned tests are set forth by way of example and that various modifications of these conditions may be made without departing from the invention which is not deemed as limited otherwise than as indicated by the claims.

We claim:
1. The process of producing an alkali metal nitrate from the corresponding alkali metal chloride which comprises bringing nitrogen peroxide in reacting relationship with the metal chloride while the latter is suspended in solid particulate form in a liquid suspension medium consisting essentially of a halogenated hydrocarbon which exists as a liquid below 45° C., said reacting relationship being within a temperature-pressure zone where nitrosyl chloride normally exists as a gas.

2. The process of producing an alkali metal nitrate from the corresponding alkali metal chloride which comprises bringing nitrogen peroxide in reacting relationship with the metal chloride while the latter is suspended in solid particulate form in a liquid suspension medium consisting essentially of a halogenated hydrocarbon which exists as a liquid at 20 to 28° C., said reacting relationship being within a temperature-pressure zone where nitrosyl chloride normally exists as a gas.

3. The process according to claim 2 wherein the reaction mixture contains not more than about 5% water based on the weight of the metal chloride present.

4. The process according to claim 2 wherein potassium chloride is converted to potassium nitrate.

5. The process according to claim 2 wherein the halogenated hydrocarbon used in the process is carbon tetrachloride.

6. The process according to claim 2 wherein the temperature and pressure in the reaction zone are so regulated as to produce a controlled partial vaporization of the nitrogen peroxide along with nitrosyl chloride formed in the reaction and the vaporized nitrogen peroxide is separated from the nitrosyl chloride and returned to the reaction zone.

7. The process of producing potassium nitrate from potassium chloride which comprises bringing nitrogen peroxide into reacting relationship with potassium chloride while the latter is suspended in solid particulate form in liquid carbon tetrachloride.

8. The process according to claim 7 wherein the reaction is carried on in the presence of not more than 5% of water based on the weight of the potassium chloride present in the reaction zone.

References Cited in the file of this patent

UNITED STATES PATENTS

| 1,875,014 | Kaselitz | Aug. 30, 1932 |
| 1,965,400 | Whittaker et al. | July 3, 1934 |
| 2,228,273 | Klingelhoefer | Jan. 14, 1941 |

FOREIGN PATENTS

| 310,230 | Great Britain | Apr. 25, 1929 |